(12) United States Patent
Buttau et al.

(10) Patent No.: US 11,325,786 B2
(45) Date of Patent: May 10, 2022

(54) GUIDE PROFILE AND CONVEYING SYSTEM

(71) Applicant: Robert Bosch GmbH, Stuttgart (DE)

(72) Inventors: Hans-Peter Buttau, Lauffen (DE); Markus Kiebel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/208,637

(22) Filed: Mar. 22, 2021

(65) Prior Publication Data

US 2021/0323770 A1 Oct. 21, 2021

(30) Foreign Application Priority Data

Apr. 15, 2020 (DE) .......................... 102020204720.0

(51) Int. Cl.
*B65G 21/22* (2006.01)
*B65G 15/62* (2006.01)

(52) U.S. Cl.
CPC ............. *B65G 21/22* (2013.01); *B65G 15/62* (2013.01)

(58) Field of Classification Search
CPC ..... B65G 21/22; B65G 2207/48; B65G 15/62
See application file for complete search history.

(56) References Cited

U.S. PATENT DOCUMENTS

| 3,265,192 | A |   | 8/1966  | Stadelman |
|-----------|---|---|---------|-----------|
| 3,491,873 | A |   | 1/1970  | Fauth |
| 4,961,492 | A |   | 10/1990 | Wiseman et al. |
| 5,857,560 | A | * | 1/1999  | Bjorkholm ........ B29C 45/14565 198/837 |
| 6,848,572 | B1| * | 2/2005  | Sisson, Jr. .............. B65G 21/22 198/860.1 |
| 9,296,564 | B2| * | 3/2016  | Kuiper .................... B65G 15/62 |
| 9,604,789 | B2| * | 3/2017  | Askerdal ................ B65G 15/62 |
| 9,815,631 | B2| * | 11/2017 | Ghezzi .................... B65G 21/16 |
| 11,078,023| B2| * | 8/2021  | Marsetti ............. B65G 21/2072 |
| 2004/0216987 | A1| * | 11/2004 | Wiggins ............. B65G 21/2081 198/841 |
| 2010/0282576 | A1|   | 11/2010 | Elsner |

FOREIGN PATENT DOCUMENTS

| DE | 31 04 262 A1     | 1/1982  |
| DE | 196 37 353 A1    | 3/1998  |
| DE | 101 18 566 A1    | 10/2002 |
| DE | 203 06 613 U1    | 7/2003  |
| DE | 10 2005 046 302 A1 | 4/2007 |
| EP | 1 273 536 B1     | 8/2009  |
| JP | S61-75713 A      | 4/1986  |

\* cited by examiner

*Primary Examiner* — Mark A Deuble
(74) *Attorney, Agent, or Firm* — Maginot, Moore & Beck LLP

(57) ABSTRACT

A guide profile and a conveying system are disclosed. The conveying system is designed with a guide profile of this type. A slide bar of the guide profile is provided with an articulated leg so that it is possible to change the slide bar on the already installed conveying system.

13 Claims, 5 Drawing Sheets

GUIDE PROFILE AND CONVEYING SYSTEM

This application claims priority under 35 U.S.C. § 119 to patent application no. DE 10 2020 204 720.0, filed on Apr. 15, 2020 in Germany, the disclosure of which is incorporated herein by reference in its entirety.

BACKGROUND

The present disclosure relates to a guide profile for a conveying system described herein, and to a conveying system described herein.

The prior art, for example DE 10 2005 046 302 A2, discloses conveying systems, also referred to as transfer systems, the basic construction of which consists of a profile body in or on which a chain is guided. The chains can be known flat top chains or accumulating roller chains. For improved guidance of the chains along the profile body, slide bars are provided which are inserted for example in recesses of the profile body, and on or along which bars the chains are guided. In this case, the chains are spaced apart from the profile body by the slide bars so that there is no direct contact between the chain and the profile body. The slide bars are held in a recess of the profile body in this case by means of clips.

The disadvantage of the solution known from the prior art is that only the end faces of the slide bars can be inserted in the profile body. This means that it is very complex to change the slide bars on a conveying system which has already been produced and installed and is already in operation, since the end faces of the slide bars to be replaced also have to be pulled out of the profile bodies. Furthermore, additional retaining means are required to hold the slide bars in the final position thereof.

SUMMARY

The problem addressed by the disclosure is now that of providing guide profiles for a conveying system which can be installed and removed in a substantially easier manner while maintaining at least equivalent functional properties. The problem addressed by the disclosure further consists in providing a conveying system comprising, or for receiving, slide bars of this type.

These problems are solved by a guide profile having the features described herein, or by a conveying system having the features described herein.

A guide profile according to the disclosure for a conveying system comprises a profile body in which a slide bar is inserted. The slide bar is designed in such a way that it can bear or carry the weight of a chain which is used as a drive by the conveying system. In this case, the slide bar is in abutment with an aluminum profile of the conveying system. The weight of the chain is supported on a profile body of a conveying system by means of the slide bar. The slide bar is in abutment with the profile body at least in some portions. According to the disclosure, the slide bar comprises an articulated leg which is designed to be inserted in a recess of the profile body by pivoting. The advantage of this solution over the prior art cited at the outset consists in the fact that, in the case of the solution according to the disclosure, the installation and the removal of the slide bar in the conveying system is substantially simplified.

In a particularly preferred exemplary embodiment, the articulated leg is in the form of a pivot leg, an arcuate portion of the slide bar is pivoted into the correspondingly arcuate recess of the profile body in a pivoting movement so that the articulated leg is received in this recess in an interlocking manner in the conveying direction.

In one preferred solution, the articulated leg is formed in a corner region of the slide bar. Advantageously, by arranging the pivot leg in a corner region, a sufficiently large surface for supporting the weight of the slide bar, and the chain, is ensured on a lower face of the slide bar. The surface pressure is accordingly low.

By way of the arrangement according to the disclosure of the articulated leg on the slide bar, this slide bar can be inserted in the profile body from above, that is to say approximately perpendicularly to the conveying direction. This type of installation and removal is particularly advantageous because, in contrast with the solutions known from the prior art, the slide bar can be readily replaced. Thus for example it is no longer necessary to remove end strips, drives, deflectors or the like in order to remove the end faces of the slide bars from the profile body. Instead, the slide bars, or portions of the slide bars, can be removed from the installed position thereof vertically. Conversely, the slide bars or portions of the slide bars can be reinserted in an equally user-friendly manner.

In one preferred exemplary embodiment, the slide bar is held in the final position by an undercut on the articulated leg by securing with a positive fit.

It is particularly preferable to form the slide bar in such a way that it can be held in the final position thereof without engagement. Accordingly, the slide bar is formed so that the shape of the articulated leg and the recess, for example by means of the undercut, are selected in such a way that the slide bar is prevented from sliding out of the profile body in an unwanted manner. The installed position and the weight of the chain also ensure that the slide bar is held in the final position thereof during the operation of the conveying system.

To prevent the slide bars from sliding out or tilting when the guide profile is being transported, it is preferable for a transport securing means to be provided. In one particularly simple and preferred embodiment, this transport securing means is in the form of an adhesive tape which is applied to two opposing end faces of the profile body in such a way that the slide bars and the profile body are in abutment together with an adhesive surface of the adhesive tape so that the slide bars are held in the final position thereof in a non-slip manner.

The conveying system according to the disclosure is designed with a slide bar according to the disclosure. According to the disclosure, the chain is supported on the profile body by means of the slide bars. The weight of the chain itself, and the installed position of the slide bar, hold the chain in a final position. There is no engagement of the slide bar in a final position.

In one preferred exemplary embodiment of the conveying system according to the disclosure, the chain is in the form of an accumulating roller chain or of a flat top chain.

BRIEF DESCRIPTION OF THE DRAWINGS

Preferred exemplary embodiments of the disclosure will be described in greater detail below with reference to schematic drawings, in which.

DETAILED DESCRIPTION

Figure 1:
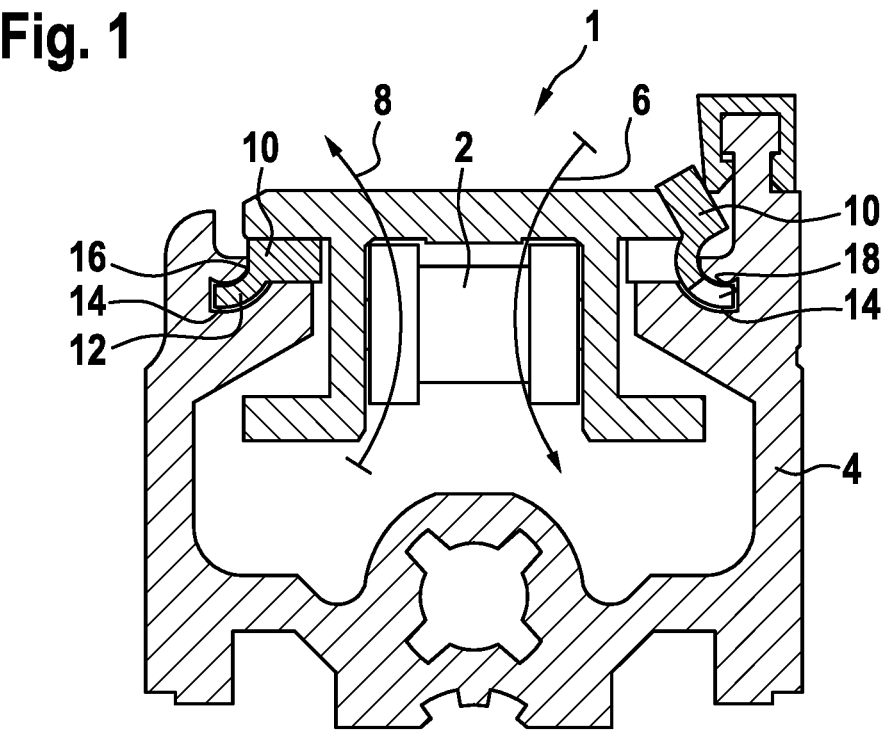
FIG. 1 is a detail of a profile body of a conveying system for use with flat top chains in a sectional view.

FIG. 1 shows part of a conveying system 1 comprising a flat top chain 2, which is guided by means of a profile body 4. In this exemplary embodiment, a conveying direction of the conveying system 1 extends perpendicularly to the plane of the drawing. The flat top chain 2 is guided along slide bars 10 in a manner known per se, which slide bars are held on the profile body 4 in such a way that they can be replaced. To illustrate an installation and removal direction 6, 8 of the slide bar 10, in this drawing, the right-hand slide bar 10 is shown in an installed position. "Installed position" means a first installation step in which the slide bar 10 is arranged together with an end portion of an articulated leg 12 on a recess 14. The slide bar 10 is shown on both sides in the final position thereof.

On a corner region 16, the slide bars 10 are provided with arcuate articulated legs 12 which dip into the recesses 14 in the profile body 4 until an end portion of the articulated leg 12 is in contact with a stop face 18 of the recess 14. This is shown in greater detail in FIG. 3.

The articulated leg 12 is inserted in the recess 14 in a type of slip/interference fit. It is thus ensured that the slide bars 10 can be inserted from above, that is to say perpendicularly to the conveying direction. By means of the weight of the flat top chain 2 itself, the slide bars 10 are held in the final position thereof. The flat top chain 2 is thus supported on the profile body 4 by means of the slide bars 10. If it is necessary to replace the slide bars 10, only the flat top chain 2 has to be spaced apart a bit further from the corresponding slide bars 10 so that these slide bars can be removed vertically and replaced with new slide bars 10 in the simplest possible manner.

Figure 2:
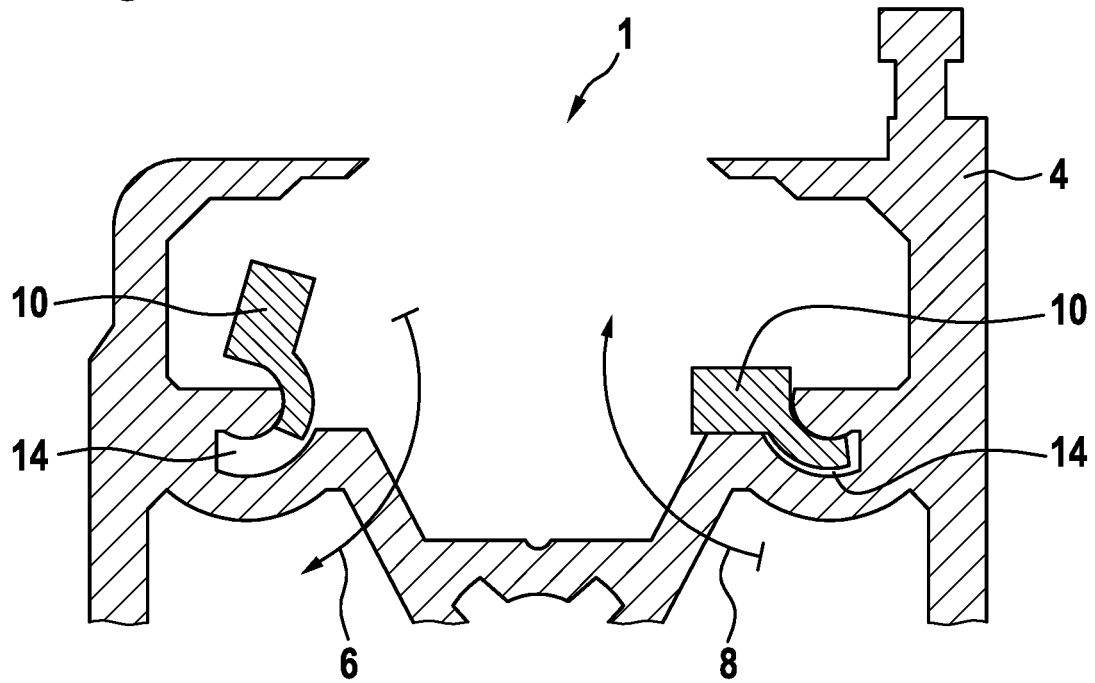
FIG. 2 is a sectional view of part of a profile body of a conveying system for use with accumulating roller chains.
Figure 4:
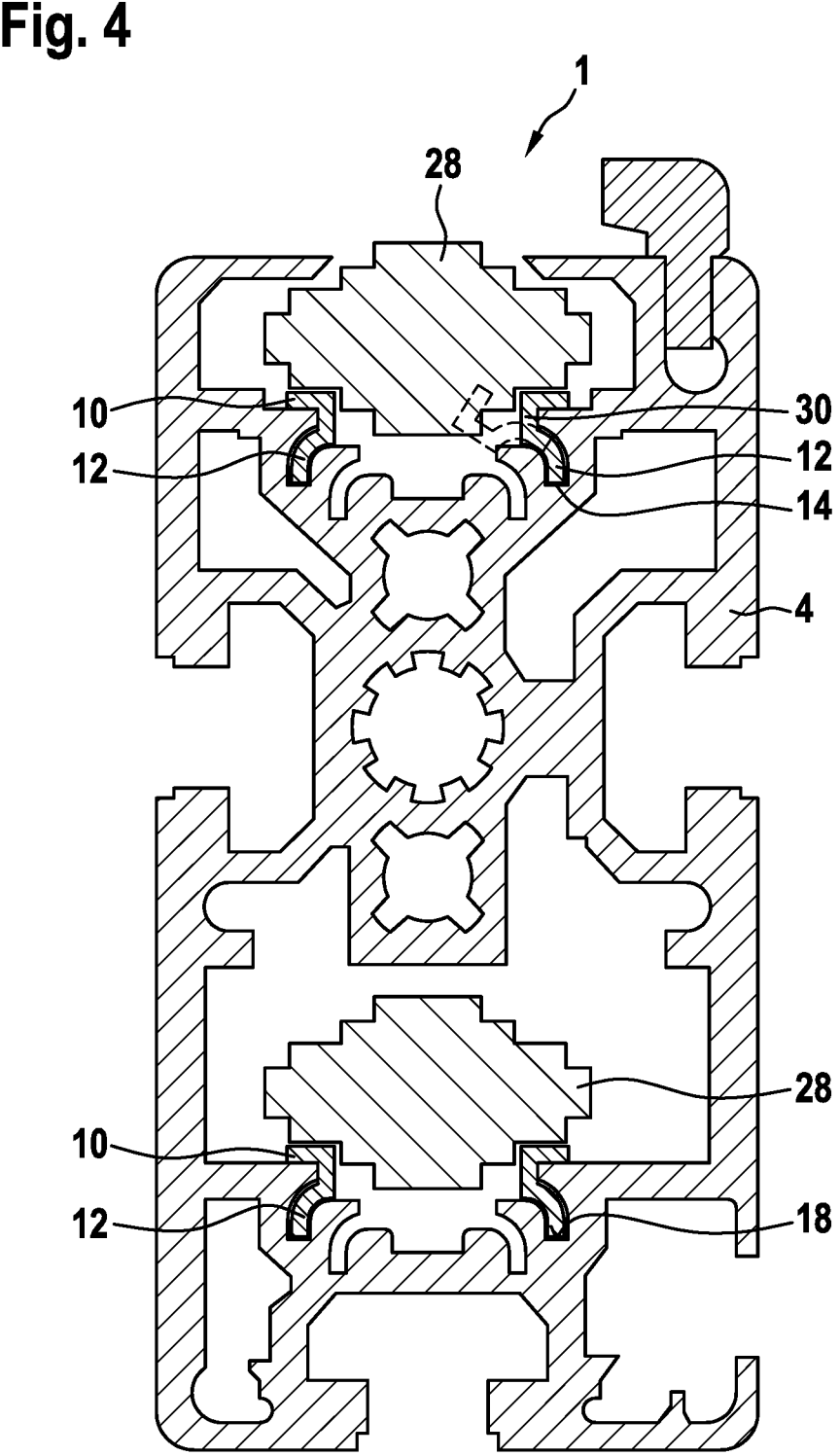
FIG. 4 is a sectional view of a profile body of a conveying system for use with accumulating roller chains.
Figure 5:
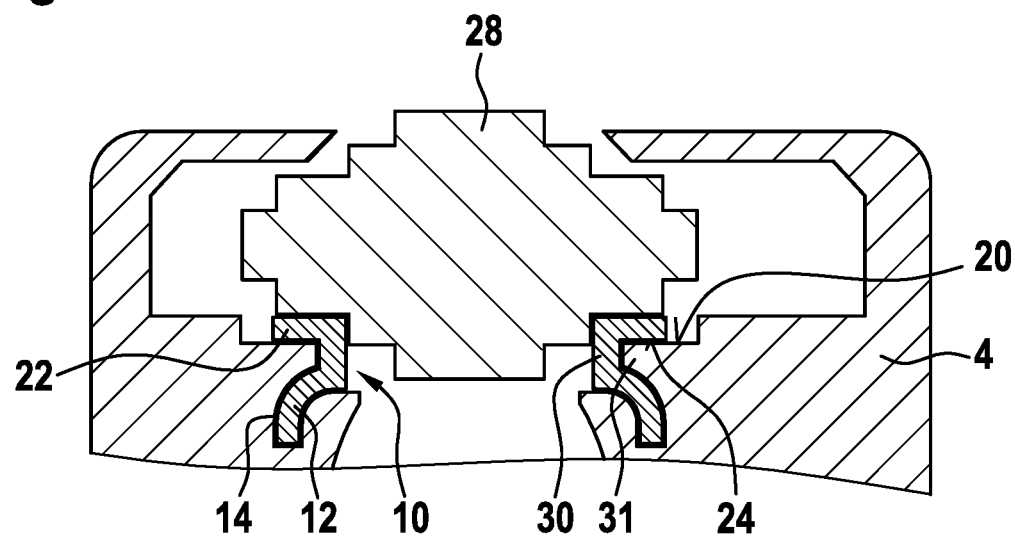
FIG. 5 is a detail drawing according to FIG. 4.

FIG. 2 shows a detail of a variant of a conveying system 1 comprising the profile body 4. The conveying system 1 shown in FIG. 2 is designed for the use of accumulating roller chains. Furthermore, the slide bars 10 are shown which are inserted in or arranged on the recesses 14 in the profile body 4. On the side of the profile body 4 which is on the left in this drawing, the slide bar 10 is arranged on the recess 14, and is thus located in the installed position. An arrow next to it shows the installation direction 4 of the slide bar 10 into the recess 14. The slide bar 10 is thus introduced into the recess 14 in an arcuate movement. At the end of the installation process, the slide bar 10 is located in the final position thereof. This final position can be seen on the side shown on the right here. On this side, an additional arrow is shown next to the slide bar 10, which arrow is intended to illustrate the removal direction 8 of the slide bar 10. As a result, the slide bar 10 is guided ("rotated") vertically out of the recess 14 in an arcuate movement and can subsequently be removed vertically. Additional exemplary embodiments comprising accumulating roller chains are shown in FIGS. 4 and 5. The conveying direction extends perpendicularly to the viewing plane. The accumulating roller chain is supported on the profile body 4 by means of the slide bars 10 when installed. Furthermore, in this exemplary embodiment, the weight of the chain ensures that the slide bars 10 are held in the final position thereof which is shown on the right in FIG. 2. To change the slide bars 10 in the conveying system 1, it is sufficient to lift the chain off the slide bar 10 slightly to remove this chain, as described previously, from the recesses 14 of the profile body 4 in the removal direction 8. The insertion of a new slide bar 10 can take place just as easily in the reverse order. In the solutions known from the prior art, the chain 2, 28 is pulled out of the profile body, that is to say is almost completely removed, in which the drive, the deflector and other components must be removed.

Figure 3:
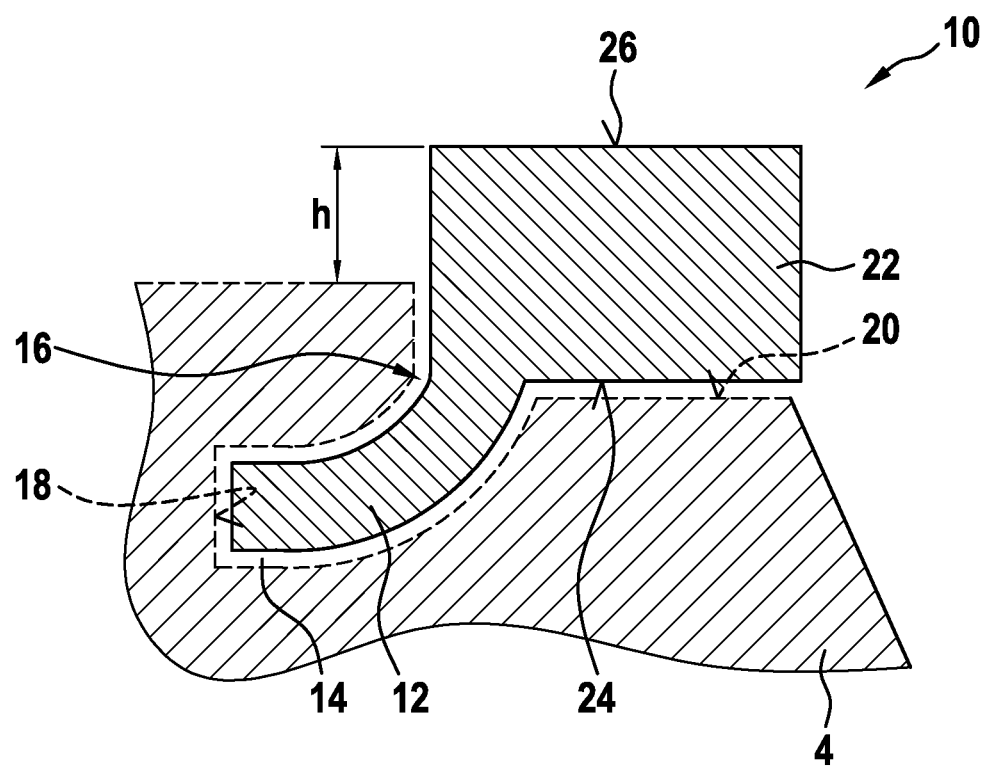
FIG. 3 is a detail drawing of a slide bar.

FIG. 3 is a detail drawing of the slide bar 10 according to either FIG. 1 or FIG. 2, which is inserted in the recess 14 in the profile body 4, in a sectional view. A rectangular main body 22 of the slide bar 10 is supported on a support face 20 of the profile body 4. The support face 20 is dimensioned in such a way that it can carry the load of the chain (not shown here) which is introduced by means of the slide bar 10. In the view selected here, a distance between the slide bar 10 and the support face 20 is shown which is used exclusively to better distinguish between the two components. The recess 14 has, at the deepest point thereof, that is to say on a rear part, the stop face 18. The preferably approximately rectangular main body 22 forms a superelevation h beyond the profile body 4, so that the chain is guided exclusively on the slide bar 10 and does not come into direct contact with the profile body 4. The articulated leg 12 extends from the main body 22.

In the drawing according to FIG. 3, the articulated leg 12 has been pivoted into the recess 14 in the most interlocking manner possible, so that an end portion of this leg is in contact with the stop face 18. In this case as well, the distance is illustrated exclusively to better distinguish between the components. The recess 14 is formed so as to correspond to the shape of the articulated leg 12 so that this leg can be pivoted into the arcuate recess 14 with a precise fit. By means of a lower face 24 adjoining the corner region 16, the slide bar 10 is in contact with the support face 20 of the profile body 4. An upper face 26, which is opposite the lower face 24 of the main body 22, is used to support the chain.

With reference to FIG. 4, an additional exemplary embodiment of the conveying system 1 is shown. The conveying system 1 is also designed for the use of accumulating roller chains 28. In this exemplary embodiment, the articulated leg 12 of the slide bar 10 does not extend out of a corner region 16 of the slide bar 10. Instead, an extension 30 which is perpendicular to the main body 22, and on which the arcuate articulated leg 12 is arranged, extends from a side of the slide bar 10 facing away from the accumulating roller chain 28 in a corner region 16.

FIG. 5 is an enlarged detail of the upper portion of this exemplary embodiment. The arcuate articulated leg 12 of the slide bar 10 is in turn formed in such a way that it is inserted in a recess 14 of the profile body 4. In the load-bearing region of the accumulating roller chain 28, which is shown in the detail drawing in FIG. 5, the slide bars 10 can be replaced in a simple manner, as described previously, that is to say perpendicularly to the conveying plane. In this case, the replacement takes place in a similar manner to in the exemplary embodiments described previously.

FIG. 5 is a detail drawing of the upper region of the guide profile according to FIG. 4. In the inserted state of the slide bar 10, that is to say in the final position, the articulated leg 12 dips into the recess 14, the extension 30 is in contact with a protrusion 31 of the profile body 4, and a load-bearing sliding region of the slide bar 10, which is arranged between the profile body 4 and the accumulating roller chain 28, is located on the profile body 4 at the top of this drawing, so that the lower face 24 of the main body 22 is in contact with the support face 20 of the profile body 4. The protrusion 31 is thus encompassed by the slide bar 10.

Figure 6:
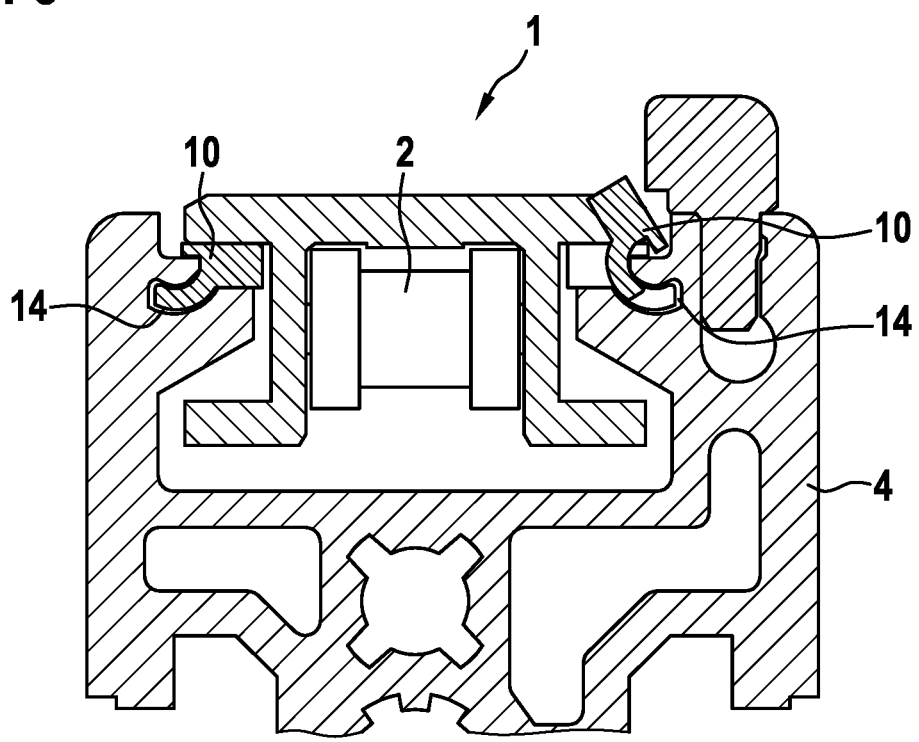
FIG. 6 is a detail of a profile body of a conveying system for the use of flat top chains in a sectional view.
Figure 7:
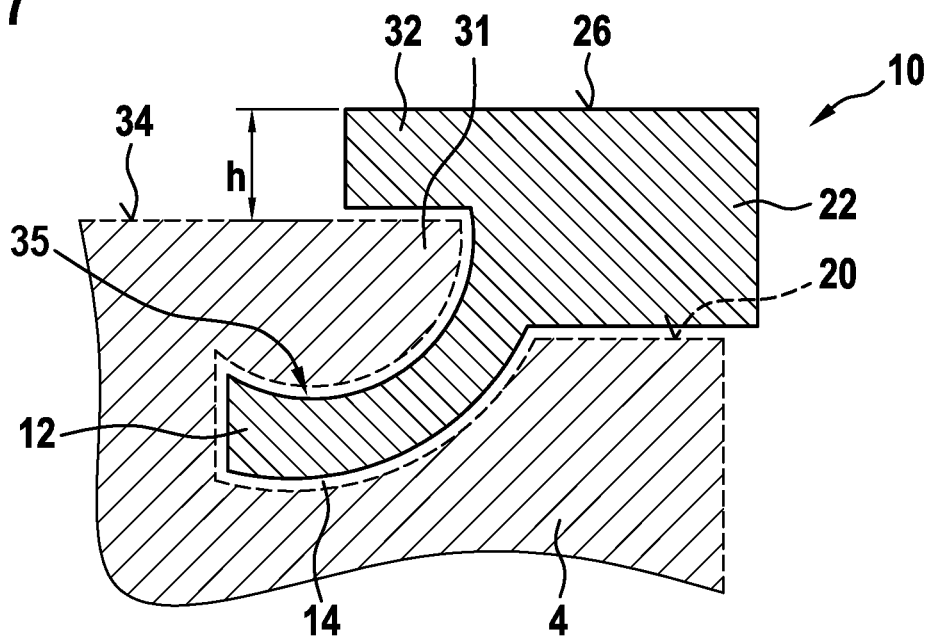
FIG. 7 is a detail drawing according to FIG. 6.

FIG. 6 shows another exemplary embodiment of a conveying system 1, which is provided for the use of flat top chains 2. In contrast with the exemplary embodiments which have been described in FIGS. 1 to 5, the slide bars 10 comprise an additional support region 32, which extends out of the upper side 26 of the slide bar 10 towards the outer faces of the profile body 4. This detail is shown in FIG. 7, which is a detail drawing of the slide bar 10 according to FIG. 6. The basic construction of the slide bar 10, and of the profile body 4 and the recess 14, correspond to the exemplary embodiment shown in FIG. 3. In the drawing according to FIG. 7, the support region 32 extends in an extension of the main body 22 beyond the recess 14 and is supported on an additional support face 34. In this exemplary embodiment as well, the protrusion 31 is thus encompassed by the main body 22, the support region 32 and the articulated leg 12.

What all of the exemplary embodiments described previously have in common is that they can be changed on the already installed conveying system 1. Slide bars 10 which are slightly bent in an undesirable manner, or slide bars 10 which have an abnormal straightness as a result of the production process, can still be used in a conveying system 1 according to the disclosure due to the undercut 35 (FIG. 7). No interference contour is produced for the chain 2, 28. This is of vital significance in particular when using flat top chains 2 which are provided with plastics material, since otherwise these chains could be damaged immediately. The exemplary embodiments also have in common the fact that no separate hold-down piece is required for holding the slide bars 10 in the desired position. This occurs solely as a result of the weight of the chain 2, 28 used in each case.

Figure 8:
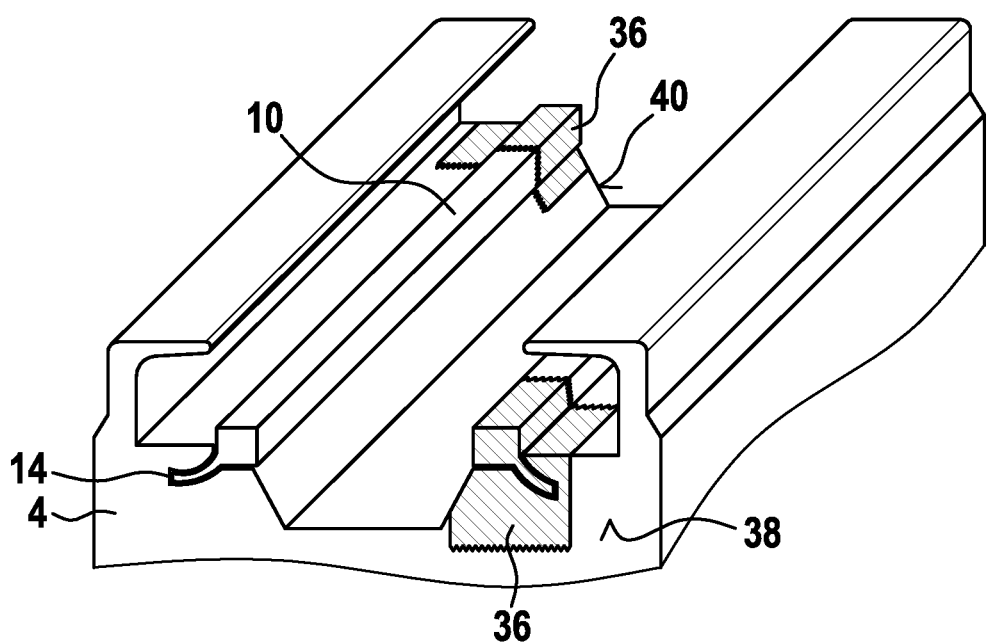
FIG. 8 is a greatly simplified, three-dimensional view of a profile body having installed slide bars and a transport securing means.

FIG. 8 is a simplified, three-dimensional view of an upper portion of an exemplary embodiment of a guide profile according to the disclosure. The slide bars 10 are pivoted into the recesses 14 and are located in the final position thereof. To prevent the slide bars 10 from slipping or tilting during transportation, these bars are provided with a transport securing means. In the current exemplary embodiment, this transport securing means is in the form of an adhesive tape 36 and is bonded/positioned over the profile body 4 and the slide bars 10 on the end faces in each case. In FIG. 8, by way of example, the rear left side and the front right side are each provided with an adhesive tape 36 which extends from a respective end face 38, 40 over the profile body 4 and a respective end portion of the slide bars 10 into an inner region of the profile body 4 and is fastened to the side of the above-mentioned components to which adhesive is applied. Other types of transport securing means are of course also conceivable. Transport covers which are placed on the end face of the profile body are also conceivable, such as clamping systems which hold the slide bar 10 in the final position thereof.

A guide profile and a conveying system are disclosed, which conveying system is designed with a guide profile of this type, wherein a slide bar of the guide profile is provided with an articulated leg so that it is possible to change the slide bar on the already installed conveying system.

LIST OF REFERENCE SIGNS 1 conveying system
2 flat top chain
4 profile body
6 installation direction
8 removal direction
10 slide bar
12 articulated leg
14 recess
16 corner region
18 stop face
20 support face
22 main body
24 lower face
26 upper face
28 accumulating roller chain
30 extension
31 protrusion
32 support region
34 support face
36 adhesive tape
38 end face
40 end face
h superelevation

What is claimed is:

1. A conveying system comprising:
a profile body configured to support a conveying system chain thereon; and
a slide bar positioned in abutment with the profile body at least in some portions,
wherein the conveying system defines a conveying direction,
wherein the profile body defines a recess,
wherein the slide bar includes an articulated leg configured to be inserted in the recess of the profile body by pivoting or squaring approximately perpendicularly to the conveying direction,
wherein the articulated leg is in the form of an arcuate pivot leg, and
wherein the recess is configured so that the articulated leg is positioned in the recess in an interlocking manner.

2. The conveying system of claim 1, wherein the articulated leg is formed in a corner region of the slide bar.

3. The conveying system of claim 1, wherein the slide bar is configured to be inserted into the profile body approximately perpendicularly to a conveying direction.

4. The conveying system of claim 1, wherein the slide bar is secured in position in an interlocking manner in the conveying direction by way of an undercut on the articulated leg.

5. The conveying system of claim 1, wherein the slide bar is held in position without engagement.

6. The conveying system of claim 1, wherein:
the slide bar further includes an extension, and
the articulated leg of the slide bar is formed on the extension.

7. The conveying system of claim 6, wherein:
the profile body includes a protrusion, and
the extension is positioned in contact with the protrusion.

8. The conveying system of claim 1, further comprising the conveying system chain, wherein:
the conveying system chain is supported on the profile body with the slide bar being interposed between the profile body and the conveying system chain, and
the conveying system chain rests upon the slide bar thereby holding the slide bar in its final position in relation to the profile body.

9. The conveying system of claim 1, wherein the conveying system chain is an accumulating roller chain or a flat top chain.

10. A conveying system comprising:
a profile body configured to support a conveying system chain thereon;
a slide bar positioned in abutment with the profile body at least in some portions; and
at least one transport securing mechanism located on an end face of the profile body, wherein:
the conveying system defines a conveying direction,
the profile body defines a recess,
the slide bar includes an articulated leg configured to be inserted in the recess of the profile body by pivoting or squaring approximately perpendicularly to the conveying direction, and
said at least one transport securing mechanism is configured and arranged to hold the slide bar in its final position thereof.

11. The conveying system of claim 10, wherein:
the articulated leg is in the form of an arcuate pivot leg, and
the recess is configured so that the articulated leg is positioned in the recess in an interlocking manner.

12. A conveying system comprising:
a profile body configured to support a conveying system chain thereon;
a slide bar positioned in abutment with the profile body at least in some portions;
an additional slide bar; and
a first transport securing mechanism and a second transport securing mechanism respectively positioned on two opposing end faces of the profile body, wherein:
the conveying system defines a conveying direction,
the profile body defines a recess,
the slide bar includes an articulated leg configured to be inserted in the recess of the profile body by pivoting or squaring approximately perpendicularly to the conveying direction, and
the first transport securing mechanism and the second transport securing mechanism are configured and arranged to hold the slide bar and the additional slide bar respectively in their final positions thereof.

13. The conveying system of claim 12, wherein:
the first transport securing mechanism includes a first adhesive tape member,
the second transport securing mechanism includes a second adhesive tape member, and
the first adhesive tape member and the second adhesive tape member are configured and arranged to hold the slide bar and the additional slide bar respectively in their final positions thereof.

* * * * *